April 25, 1933.   D. W. VOORHEES, JR   1,905,661
STEEL WHEEL
Filed Nov. 4, 1931
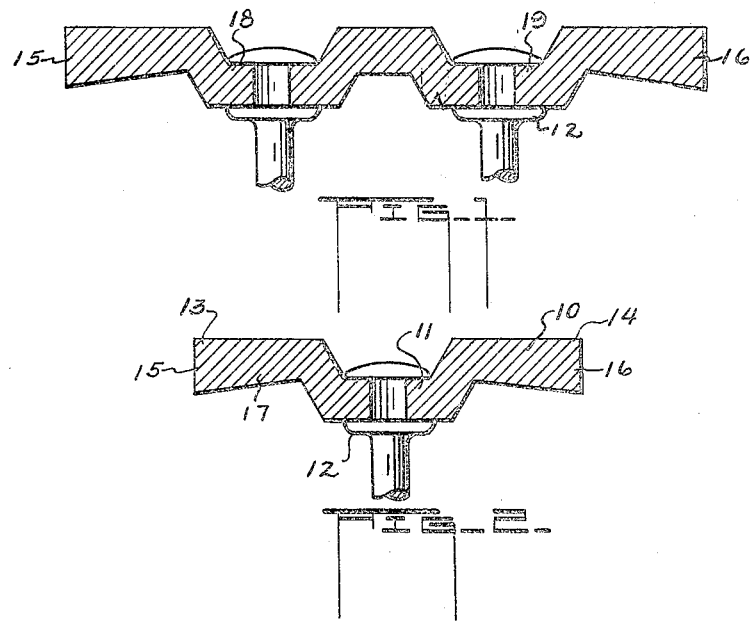
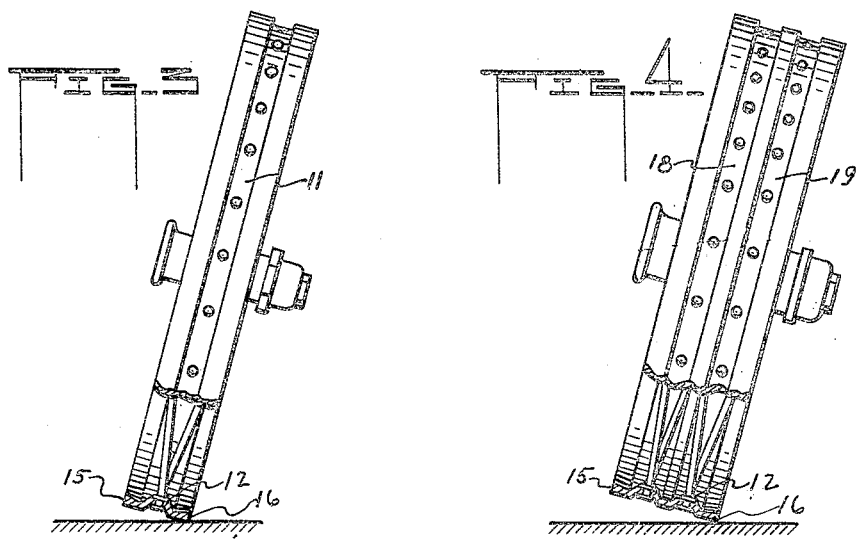
INVENTOR
Daniel W. Voorhees, Jr
PER
Tefft and Tefft
ATTYS.

Patented Apr. 25, 1933

1,905,661

UNITED STATES PATENT OFFICE

DANIEL W. VOORHEES, JR., OF PERU, ILLINOIS

STEEL WHEEL

Application filed November 4, 1931. Serial No. 572,889.

This invention relates to steel wheels and more particularly to steel wheels adapted for use upon heavy road grading machines utilizing wheels of the leaning type.

One of the objects of the invention lies in the provision of a specially formed tire portion for heavy steel truck wheels, the latter being particularly adapted for use in leaning wheel graders and machines of such heavy duty type.

Another object lies in the provision of a steel truck wheel having a grooved tire which is rolled in a manner to present upon its exterior surface, a flat contacting surface, the edge portions, however, being expanded to increase the wearing surface.

Still another object lies in the provision of a specially formed tire portion for steel wheels, particularly adapted for use upon leaning wheel graders and heavy duty machines of such type, the edge portions of the tire being expanded to increase the wearing surface, there being also a tapering of the tire upon the inside towards the groove portion adapted to receive the spoke buttons.

Other objects will appear in the following specification, taken in connection with the annexed drawing, in which—

Fig. 1 is a cross-sectional view of my steel wheel tire portion, said view showing a double groove tire;

Fig. 2 is a similar view showing my invention as applied to a single groove tire;

Fig. 3 is a perspective view, partially in section, of a steel wheel of a single groove type; and Fig. 4 is a similar view showing a wheel of the double groove type.

Before referring to the drawing, it might be stated that wheels of this type have always had their rim portions rolled in such manner that the road contacting sides thereof have been parallel with the road surface, and further, the tires have practically always been of uniform thickness, the full width.

Further, irrespective of the use to which steel wheels of this type have been applied, the tire or tread portions have always been uniform in thickness, even though, as one may readily notice, the edge portions of said wheels have been called upon to bear in many instances the brunt of the load as well as the wear. Further they are quite heavy, although weight, in instances of this kind, is not an advantage.

Applicant, appreciating the many uses to which these wheels are applied, and for instance, when same are used upon leaning wheel graders and other heavy duty types of machine upon which a leaning wheel is used, now seeks to provide and produce a wheel which is infinitely better because of the peculiar fashioning of the edge portion thereof.

In the drawing, and particularly in Fig. 2, is shown a groove type of steel wheel, the tread portion thereof being referred to as 10 and the groove portion as 11. The groove in this instance is deepened considerably for the purpose of receiving the spoke buttons 12. The groove is sufficiently deep to absolutely protect the spoke buttons, as is clearly seen in Figs. 3 and 4 of the drawing.

The road-contacting outer edges 13 and 14 are expanded or thickened as at 15 and 16 to a width greater than that of the remaining portions of the tire. This expanding of the outer edges of the tire obviously increases the thickness of the road-contacting tire portion at either edge thereof. The wheel is rendered extremely sturdy by such construction, although the disadvantage of increased weight is overcome by gradually tapering the inside of the wheels as at 17, inwardly towards the groove. Thus, it will be seen that as a general proposition the efficiency of the wheel has been greatly increased by thickening the road contacting edges and also a saving in material, due to the inward taper at a point not requiring the added thickening of the tire.

Turning to Figs. 3 and 4, we are immediately confronted with a well known, and as a matter of fact, common position of steel wheels of this type with respect to the road surface. Realizing the uses to which these sturdy wheels are placed, it becomes immediately evident that applicant has produced a steel wheel having a tire formed in such manner as to have additional strength and wear-resisting qualities when the wheel is placed in a leaning position.

Again, with respect to the double groove type of wheel, which is shown in Fig. 1 and which has the dual grooves 18 and 19, it might be said that for the first time here there is presented a double-groove tire that is hot rolled at the mill. Tires of this type have previously been cold rolled, but the present double groove type of wheel is the first that has ever been produced in a hot rolled manner. Obviously, the same description with respect to this double groove tire is applicable, and the edge portions 15 and 16 thereof are formed, of course, in exactly the same manner.

As respects the operation of applicant's wheel, a glance at Figs. 3 and 4 immediately shows the practicability of such peculiar fashioning of the edge portions thereof and the advantages that are inherent in a tire for steel wheels of this character.

What I claim is:

A heavy duty steel wheel, comprising an annular band having a circumferential grooved medial portion, the base of the grooved portion forming means for securing spokes thereto, flanges on either side of the grooved portion offset radially from said base, said flanges increasing in thickness laterally from the side walls of the grooved portion and having tread peripheries on equal radii of the wheel.

In testimony whereof I have hereunto affixed my signature.

DANIEL W. VOORHEES, Jr.